METHOD AND APPARATUS FOR STORING IMFORMATION

Filed Nov. 23, 1956

INVENTOR.
JEROME R. SINGER
BY
Jeffers & Gust
ATTORNEYS 3,017,612

METHOD AND APPARATUS FOR STORING INFORMATION

Jerome R. Singer, Washington, D.C., assignor to National Scientific Laboratories, Inc., Washington, D.C., a corporation of Delaware Filed Nov. 23, 1956, Ser. No. 623,921
4 Claims. (Cl. 340—173)

The present invention relates to a method and apparatus for storing information and more particularly to a binary storage device having utility in combination with digital computers.

Storage or memory devices with which this invention is primarily concerned are bi-stable in the respect that they generate selectively one of two alternative conditions or signals. These signals may be characterized as or represented by the digits "1" and "0," respectively, or "yes" and "no," depending upon the apparatus or equipment with which the device is to be used.

The present invention relates to such memory devices and is capable of distinguishing between two different signal conditions and of storing over a long period of time any particular signal condition for immediate "reading." It utilizes the principles of electrolysis, or, more broadly, electrochemistry for storing information and for supplying such stored information in the form of an electrical signal for subsequent read out purposes.

The terms "reading," "read out," and "reading out" as used herein relate to the functional or operative characteristics of storage devices or apparatus involved in sensing the character of the binary information stored. They are not intended to describe or define any mental step, determination or calculation involved in the method of this invention.

It is an object of this invention to provide a method and apparatus for storing information over substantial periods of time and for "reading out" this information when desired.

It is still another object of this invention to provide an apparatus for storing information which apparatus is simple in design, economical to construct, and efficient in operation.

Still another object of this invention is to provide a memory cell of simple design which may be conveniently connected into electronic circuitry as an ordinary circuit component.

Still further objects will become apparent as the description proceeds.

To the accomplishment of the above and related objects, the invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 1:
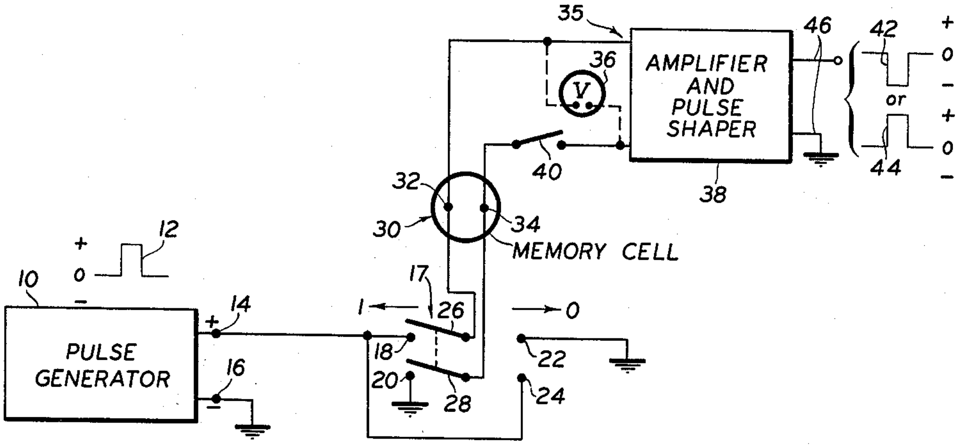
FIG. 1 is a circuit diagram of one embodiment of this invention.

Referring more particularly to FIG. 1, a pulse generator 10 produces either automatically or in response to manual operation a pulse 12 or source of pulses of positive voltage at the output terminals 14 and 16. Coupled to the output terminals 14 and 16 is a double-pole, double-throw switch 17 having stator contacts 18, 20, 22 and 24, respectively, and switch arms 26 and 28, respectively. Specifically, the terminal 14 is connected to switch terminals 18 and 24. Terminals 20 and 22 are grounded or otherwise connected to the pulse generator terminal 16.

Connected to the switch arms 26 and 28 is an electrolytic or memory cell 30. This cell is provided with two terminals 32 and 34 across which are connected a suitable "read out" device 35 in the form of either a divided scale voltmeter 36 or an amplifier and pulse shaper 38 or both as may be desired. A normally open switch 40 is preferably connected in series with the memory cell terminals for the purposes of providing a means to "read" the stored information of the cell 30 as may be desired. This switch may, of course, be automatically operated periodically by suitable, conventional computer circuitry and mechanisms.

The circuit 38 may be of conventional configuration, being capable of amplifying the signal supplied by the memory cell 30 and of shaping this signal to any suitable form, such as the negative squarewave pulse 42 or the positive squarewave pulse 44.

The double-pole double-throw switch 17 is merely illustrative of the basic circuitry and principles of operation of this invention, and may be replaced by any suitable electronic or mechanical switching device which supplies binary information to the memory cell 30. It is the purpose of the "read out" devices 35 to determine the sense of the stored binary information and to provide either a visual indication thereof by means of a voltmeter 36 or the like, or a corresponding binary signal 42 or 44 which may be utilized by any associated computer apparatus or polarity-discriminating circuits of conventional design. The voltmeter 36 is of the centrally divided scale type wherein a reading in one direction indicates a positive signal, and a reading in the opposite direction indicates a negative signal.

In operation, assuming that the switch arms 26 and 28 are closed onto the contacts 18 and 20, a positive pulse 12 of voltage from the pulse generator 10 is coupled to the cell 30. This voltage pulse charges the cell to a polarity such that the terminal 32 will be positive and the terminal 34 will be negative. This charge will remain in the cell 30 until the switch 40 is closed at which time the meter 36 will register, for example, in a positive direction indicating that the terminal 32 is positively charged. Similarly, the circuit 38 will receive the stored signal, and will amplify and shape this signal to a suitable form and supply it as, for example, the squarewave pulse 44. Assuming that the polarity of the circuit 38 produces a positive signal at its output terminals 46 in response to the positive potential on the cell terminal 32, a signal indicative of the cell polarity is thus provided. From this it follows that if the cell terminal 32 is negative, the circuit 38 will produce the negative pulse 42 as an indication thereof.

If the switch arms 26 and 28 are closed against contacts 22 and 24, the cell 30 will be oppositely charged by the pulse 12, and terminal 32 being negative and the terminal 34 being positive. Upon closing the switch 40, the meter 36 will read oppositely. Additionally, the circuit 38, if used, will produce the signal 42.

It will now be obvious that the direction of closure of the switch arms 26 and 28 may be determined by only reading the meter 36 after closure of the switch 40, a positive reading on the meter 36, indicating that the switch arms 26 and 28 have been thrown toward the left, and a negative reading indicating the switch arms have been thrown toward the right.

Figures 2, 3:
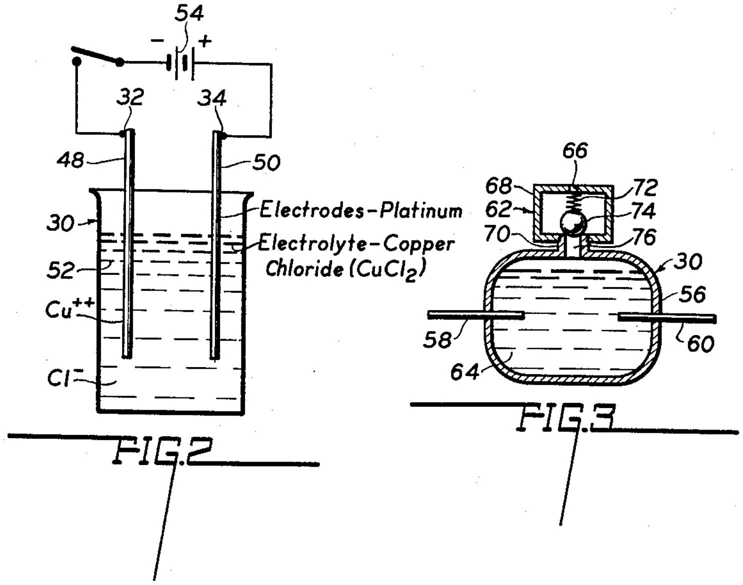
FIG. 2 is a diagrammatic illustration of an electrolytic cell which is used in explaining the operation of this invention.
FIG. 3 is a specific memory cell of this invention.

The memory cell 30 is illustrated in FIGS. 2 and 3 as being of the electrolytic type. It will appear as obvious to persons skilled in the art that other electro-chemical cells which are capable of storing a unidirectional potential may be used instead.

Referring to FIG. 2 as illustrative of the storage principles of this invention, two platinum electrodes 48 and 50 are immersed in an electrolyte 52 of copper chloride. By application of a unidirectional voltage to the electrodes 48 and 50, electrolytic action deposits copper on the electrode or cathode 48. A gas or reactant from a secondary reaction is liberated at the electrode or anode 50. Removal of this applied potential thereupon leaves deposited on the cathode 18 a plating of copper which may now be considered as the material of the cathode. Since this cathode material is now dissimilar to that of the anode 50, a voltaic cell results having a voltage which is dependent upon the position of the two metals, copper and platinum, in the "electro-chemical series." Such voltage will be approximately .519 volt. If a voltmeter, as a current-consuming device, is now coupled across the two electrodes 48 and 50, a reading will be produced depending upon the polarity and magnitude of the charge.

While platinum has been suggested as a suitable material for the electrodes 48 and 50, it will appear that other metals may be used as design requirements may dictate. For example, some suitable metals are magnesium, aluminum, zinc, iron, cobalt, nickel, tin, lead, copper, silver, mercury and gold, and the electrolyte may consist of any halogen salt solution of the above foregoing metals, or any metallic sulphate, chlorate, or the like. The particular materials used in the electrodes and electrolytes will depend upon the voltage required by the cell as well as that chemical condition necessary to store and supply a binary charge selectively.

The cell of FIG. 2 has been illustrated and described as having been charged in one direction. If the polarity of the battery 54 is reversed, reverse charging takes place, the electrode 48 becoming the anode and the electrode 50 becoming the cathode.

In FIG. 3 is illustrated a suitable cell design especially adapted for incorporation into electronic circuitry in much the same manner as ordinary resistors and condensers of the smallest physical size. The cell consists of a casing or capsule 56 having two platinum or the like electrodes 58 and 60 sealed therein and a relief valve 62 which will permit the escape of any gases produced by secondary reactions. The electrolyte 64 which is sealed into the capsule 56 is a solution such as ionized copper chloride and completely submerges the inner ends of the two elements 58 and 60. An opening or aperture 66 is provided in the cap 68 of the relief valve 62, which cap is threaded onto a suitable embossment 70 on the capsule 56. A helical compression spring 72 forces the ball valve 74 onto the exhaust port 76 in the embossment 70. Gases which may be internally generated by the electrolytic action therefore may escape past the ball valve 74.

It will now appear that the memory cell of this invention may be alternatively charged according to the polarity of the charging voltage. Discharging the cell thus becomes a means of "reading out" the stored charge. As a binary storage device, the present invention is superior to ferroelectric and ferromagnetic devices of the type employed in conventional digital computers in the respect that little or no time is required to "read out" the stored information. Thus, there results a faster operating apparatus. The memory cell of FIG. 3 is extremely simple in design and small in size and may be readily replaced or serviced in equipment as may be required.

If there should be a power failure in computing apparatus utilizing this invention, the stored information would not be destroyed inasmuch as the memory cell remains in the same condition for substantial periods of time. The memory cell is not subject to fatigue over many millions of cycles of operation and a number of cells may be connected in series or in parallel as desired to obtain different operating characteristics. Other advantages residing in this invention will appear to a person skilled in the art.

What is claimed is:

1. A binary information storage system comprising a voltaic cell having a pair of electrodes of similar metal in an electrolyte, a source of discrete voltage pulses of selective polarity, means for selectively coupling said source across said electrodes thereby to impress a pulse of predetermined polarity on said cell whereby said cell is charged to the polarity of said pulse, voltage polarity detecting means, and means for selectively coupling said detecting means across said electrodes thereby to indicate the polarity of said charge on said cell.

2. A binary information storage system comprising a voltaic cell having a pair of electrodes of similar metal in an electrolyte, means for generating discrete unidirectional voltage pulses; polarity reversing switch means for selectively coupling said pulse generating means across said electrodes thereby to impress a pulse of predetermined polarity on said cell whereby said cell is charged to the polarity of said pulse, voltage polarity detecting means, and means for selectively coupling said detecting means across said electrodes thereby to indicate the polarity of said charge on said cell.

3. A binary information storage system comprising a voltaic cell having a pair of electrodes of similar metal in an electrolyte, means for generating discrete voltage pulses, switching means coupling said pulse generating means across said electrodes for selectively impressing thereon a pulse of predetermined polarity whereby said cell is charged to the polarity of said pulse, voltage polarity detecting means, and means for selectively coupling said detecting means across said electrodes thereby to indicate the polarity of said charge on said cell.

4. A binary information storage system comprising a voltaic cell having a capsule-like casing with two electrodes of the same metal extending into said casing, said casing having an electrolyte therein surrounding said electrodes, said electrolyte being composed of a soluble metallic salt solution, said casing having an escape valve for relieving gas pressure therein, means for generating discrete unidirectional voltage pulses, polarity reversing switch means for selectively coupling said pulse generating means across said electrodes thereby to impress a pulse of predetermined polarity on said cell whereby said cell is charged to the polarity of said pulse, voltage polarity detecting means, and means for selectively coupling said detecting means across said electrodes thereby to indicate the polarity of said charge on said cell.

References Cited in the file of this patent

UNITED STATES PATENTS

| | | |
|---|---|---|
| 359,877 | Meserole | Mar. 22, 1887 |
| 389,882 | Faure | Sept. 25, 1888 |
| 1,902,081 | Kershaw et al. | Mar. 21, 1933 |
| 2,695,396 | Anderson | Nov. 23, 1954 |
| 2,696,600 | Serrell | Dec. 7, 1954 |
| 2,743,430 | Schultz | Apr. 24, 1956 |
| 2,791,473 | Mattox | May 7, 1957 |